United States Patent [19]

Wieland et al.

[11] 4,091,896

[45] May 30, 1978

[54] CHAIN SAW BRAKING MECHANISM

[75] Inventors: Dieter Wieland, Neckarrems; Volker Schurr, Waiblingen, both of Germany

[73] Assignee: Firma Andreas Stihl, Waiblingen, Germany

[21] Appl. No.: 760,674

[22] Filed: Jan. 19, 1977

[30] Foreign Application Priority Data

Jan. 22, 1976 Germany ............................ 2602247

[51] Int. Cl.2 .............................................. B60T 13/04

[52] U.S. Cl. ...................................... 188/166; 30/382; 188/77 R; 192/89 A

[58] Field of Search ............... 188/77 R, 166; 30/380, 30/381, 382, 383; 192/89 R, 89 A, 89 QT; 74/2, 529, 535; 83/DIG. 1

[56] References Cited

U.S. PATENT DOCUMENTS

| | | | |
|---|---|---|---|
| 1,532,212 | 4/1925 | Wilms | 74/2 |
| 2,092,104 | 9/1937 | Bowden | 192/89 A |
| 3,174,324 | 3/1965 | Ostertag | 74/2 |
| 3,601,236 | 8/1971 | Stephenson | 192/89 A |
| 3,776,331 | 12/1973 | Gustafsson | 188/166 |
| 3,923,126 | 12/1975 | Bidanset | 188/166 |
| 3,934,345 | 1/1976 | Hirschkoff | 188/166 |
| 3,970,178 | 7/1976 | Densow | 30/381 |
| 3,992,779 | 11/1976 | Marks et al. | 30/381 |

*Primary Examiner*—Trygve M. Blix
*Assistant Examiner*—Edward R. Kazenske
*Attorney, Agent, or Firm*—Bacon & Thomas

[57] ABSTRACT

Disclosed is a braking mechanism for a hand-held, motor-driven chain saw, comprising: a brake drum which rotates with the drive for the saw chain; a braking member positioned to selectively contact the brake drum in order to stop the chain; a lever pivotably mounted on the saw and extending to the vicinity of the guide handle; an arm, preferably a V-shaped rocker arm having a locking recess therein, pivotably connected to the saw and connected to the braking member for selectively moving the braking member into contact with the brake drum upon rotation of the arm into a braking position; a spring connected to the saw and to the arm for biasing the arm toward the braking position; a tongue member pivotably attached to the saw and adapted to be moved in contacting relationship with the arm, and to preferably engage in the locking recess in the arm, to move the arm at least out of the braking position and lock it there; and a cam member, separate from the tongue member, pivotably connected to the saw and responsive to rotation of the lever for activating movement of the tongue member relative to the arm, preferably a cam member mounted coaxially and in a common plane with the tongue member.

17 Claims, 7 Drawing Figures

CHAIN SAW BRAKING MECHANISM

BACKGROUND OF THE INVENTION

The invention concerns a braking mechanism for a motor-driven hand saw, especially a motorized chain saw, in which, for the avoidance of a dangerous operating condition, a hand protection lever, which can be rotated by the operator, is arranged near the guide handle which runs transversely to the saw. The lever, with its rotating motion, brings a spring biased band brake into contact with a brake drum, which rotates with the sawing tool, through the release of a lock. An activating cam is connected with the hand protection lever, whereby, by means of the cam, a rocker arm which engages the brake band, and which is connected with a brake spring, can be put under tension and locked by a rotating motion counter to the direction of the guide handle, resulting in release of the brake band. The rocker arm can be unlocked by means of an opposite rotating motion of the hand protection lever, which then brings the brake band into contact with the brake drum.

In a brake mechanism of this type, which is known from German Offenlegungsschrift No. 2,217,707, one end of the prestressed brake spring engages with the brake band on the rocker arm which has a single-arm configuration. In the release position of the brake band, this rocker arm with tensioned brake spring is stopped by a stop pawl which is under the tension of a torsion spring. For the purpose of unlocking the stop pawl, a pin which is located excentrically with respect to the rotational axis of the hand protection lever is provided. The pin lifts the stop pawl out of a detent on the lever arm which is connected with the brake band and the brake spring, during the release motion of the hand protection lever, whereby the brake spring is released and the braking process is initiated by the application of the brake band on the brake drum. For the purpose of tensioning the brake spring, a second, also excentrically located pin is connected with the hand protection lever. This pin, upon a rotating motion of the hand protection lever in the direction away from the guide handle, pushes the rocker arm away (with a simultaneous tensioning of the brake spring) to such an extent that the stop pawl can seat in its stop position. This known braking device requires a relatively large consturctional outlay, together with a correspondingly high space requirement for accommodating the braking mechanism in the housing of the saw.

SUMMARY OF THE INVENTION

In contrast, an object of this invention resides in providing a space-saving method of construction for a braking mechanism of the initially mentioned type.

It is a further object of the invention to assure at the same time that a considerably shorter path of the hand protection lever is required for release of the brake mechanism.

Another object of the invention is to provide an improved chain saw comprising the improved braking mechanism according to the invention. In accomplishing the foregoing objects, there has been provided in accordance with the present invention a braking mechanism for a hand-held, motor-driven, preferably gas-engine-driven chain saw which includes a guide bar for the chain, means connected to the shaft of the motor for driving the chain around the guide bar and a guide handle arranged on the saw generally transverse to the guide bar. The braking mechanism comprises a brake drum which rotates with the driving means for the chain; a braking member positioned to selectively contact the brake drum in order to stop the chain; a lever pivotably mounted on the saw and extending to the vicinity of the guide handle; means including an arm, preferably a V-shaped rocker arm, pivotably connected to the saw and connected to the braking member for selectively moving the braking member into contact with the brake drum upon rotation of the arm into a braking position; a spring connected to the saw and to the arm for biasing the arm toward the braking position; a tongue member pivotably attached to the saw and adapted to be moved in contacting relationship with said arm to move said arm at least out of the braking position; and means, separate from the tongue member, pivotably connected to the saw and responsive to rotation of the lever for activating movement of the tongue member relative to the arm.

In a preferred embodiment, the activating means comprises a cam member mounted coaxially with the tongue member, and the tongue member and the cam member lie in a common plane.

The arm preferably comprises at least one locking recess in an edge thereof and the tongue member is adapted to engage in the recess as a stop to prevent the arm from moving into the braking position.

Thus, the activating means activates movement of the tongue member to move the arm out of the braking position in response to rotating movement of the lever toward the guide handle, whereby the tongue member moves in contacting relationship with the arm until it engages in the locking recess in the arm and locks it out of the braking position. The activating means also activates movement of the tongue member out of engagement in the locking recess in response to rotating movement of the lever away from the guide handle.

Preferably, one leg of the V-shaped rocker arm includes the locking recess on its side facing the cam member. In one embodiment, the rocker arm is pivoted at its base (vertex), the braking member is connected to one leg thereof, the locking recess is on the other leg and the spring is attached to the other leg in the vicinity of the locking recess. In another embodiment, the rocker arm is pivoted on one of its legs, the locking recess is located on the other leg and the spring and the braking member are connected to the rocker arm at its base (vertex).

According to another aspect of the invention, in one embodiment the lever and the cam member are integral and comprise a single pivotable connection to the saw. Whereas, according to another embodiment, the lever and the cam member comprise separate pivotable connections to the saw and are excentrically connected together.

Further objects, features and embodiments and suitable further developments will become apparent from the embodiments which are described in the following detailed description and which are illustrated in greater detail in the attached drawings.

DETAILED DESCRIPTION OF PREFERRED EMBODIMENTS

For the solution of the aforementioned problem, it is provided in accordance with this invention that, for the tensioning and locking of the rocker arm, which is connected with the brake spring and the brake band, a rotatable pin which is directed toward the side edge of the rocker arm is arranged coaxially with the activating cam. In a further embodiment of the invention, the pin can evidence a free rotating motion which is limited with respect to the activating cam by stops. Hereby, the arrangement can advantageously be made in such a way that, at the end of the tensioning motion, the pin engages in a stop recess on the rocker arm and holds the rocker arm against the force of the brake spring which acts on the rocker arm.

Figure 1:
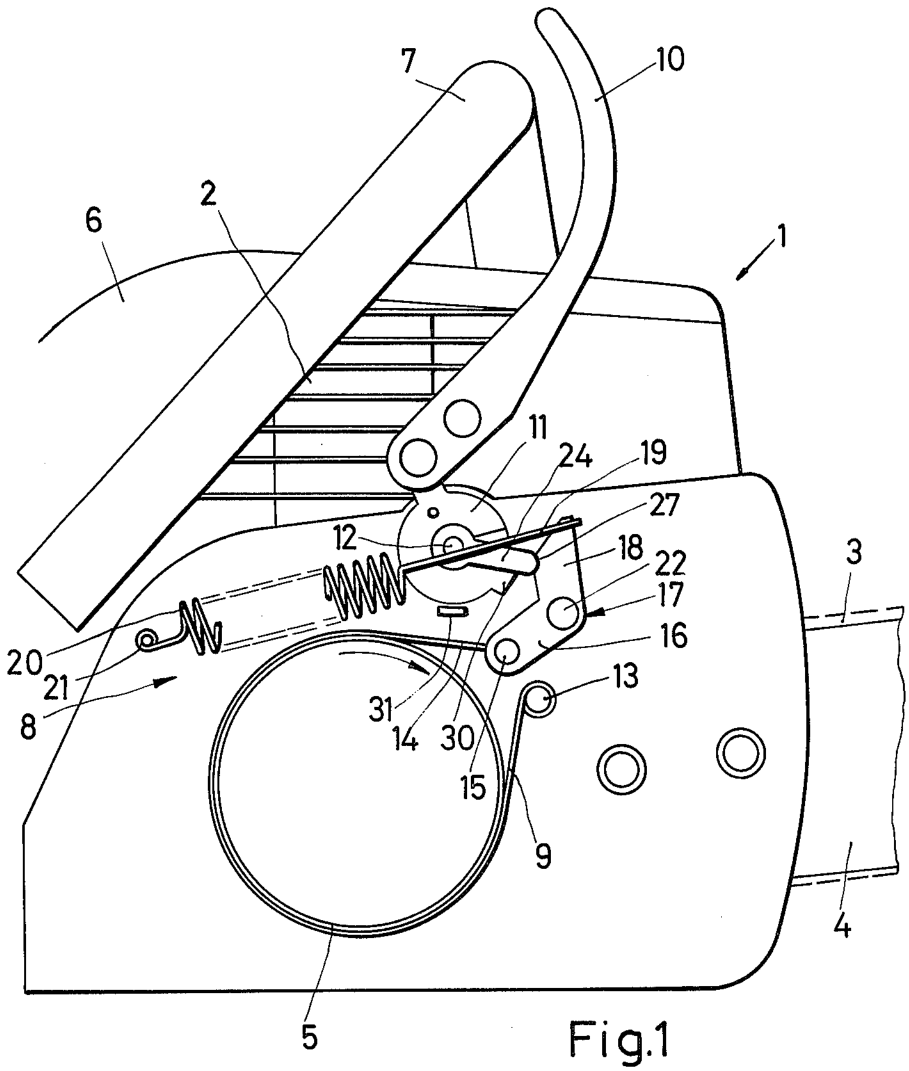
FIG. 1 is a plan view partly cut away illustrating a first embodiment of a motorized chain saw with a braking mechanism according to the invention, whereby the brake mechanism is illustrated in part schematically.

Turning now to the drawings, the brake mechanism illustrated in FIG. 1 is part of a portable motorized chain saw 1, having a combustion engine 2, for driving a saw chain 3, which is indicated by dashed lines and which runs around a bar 4.

A brake drum 5 which carries a sprocket, which is not illustrated in detail, for driving the saw chain 3 is connected with the combustion engine 2 in a known manner via a centrifugal clutch mechanism, which is likewise not illustrated. At the top of the housing 6 of the motorized chain saw 1, a front handle 7 is attached for guidance, which is gripped by an operating person during the operation of the motorized chain saw together with a rear handle, which is not illustrated, and which is attached on the opposite end of the drive portion approxmiately at the height of the saw bar 4.

The brake drum 5 is part of the brake mechanism 8 according to this invention, which is shown in a cross-sectional illustration and which also comprises a brake band 9 and a hand protection lever 10, as well as an activation cam 11 which is coupled with the latter.

The hand protection lever 10 and the activation cam 11, which is rigidly connected to it, are supported on a stationary pivot pin 12, which is fastened in the housing 6.

The brake band 9 is connected at one of its end sections to a fastening pin 13. Its other end section 14 engages with a bolt 15 which is seated on an arm, designated as 16, of a two-arm rocker arm 17. A brake spring 20 engages the second arm 18 at its end section 19 and is rigidly supported at its other end on the housing, by means of a pin 21.

The brake spring 20 which is always under tension tends to rotate, in the counter clockwise direction, the two-arm rocker arm 17, which is rigidly supported on the housing but is rotatable about bearing pin 22, and in this way it tends to bring the brake band 9 into contact with the brake drum 5 by means of tension on the end section 14 of the brake band. This is prevented by a tongue 24 which is provided in accordance with this invention. Tongue 24 serves both for tensioning and locking of the rocker arm 17, and is supported coaxially with the activation cam 11 on its swivel pin 12, as can be better seen in FIGS. 2 to 5. The free end of tongue 24 is directed toward the inner side edge 25 of the rocker arm 17. This tongue has a rounded head 26, with which it engages, in the tension position in accordance with FIG. 2, as well as in the release position in accordance with FIG. 3, in a stop recess 27. This recess is arranged closely below the end section 19 of the brake spring 20, which engages the second lever arm 18 of the rocker arm 17, so that, under the tension of the brake spring 20, the tongue 24 cannot leave the recess 27 in a sideways direction, because the tension component of the spring force which is directed tranverse to the longitudinal direction of the tongue 24 is only very small.

The tongue 24 has rotational freedom with respect to the activating cam 11 and is limited by two stops 28 and 29. These stops 28 and 29 are formed by the side walls of the radial cut-out section 35 in the activating cam 11. A protruding radial cam 30 extends beyond the remaining circumferential surface area of the activating cam 11 and is contiguous with stop 29. Cam 30 is designed to make contact with a limit stop 31 on the housing upon clockwise rotary motion of the activating cam 11, resulting in the braking position in accordance with FIG. 4.

An operating lever spring 32 is wound around the swivel pin 12 of the activating cam 11, and, with one leg engages in a bore 33 in the activating cam 11, and, with the other leg, is connected with the housing of the chain saw in a manner which is conventional and is not shown in the drawings. The operating lever spring 32 tends to rotate or swing the activating cam 11 and hence the hand protection lever 10, which is rigidly connected with it, in a clockwise direction, until the stop surface 28 of the radial cut 35 comes into contact with pin 24, which engages in the stop recess 27 (release position in accordance with FIG. 3), or until the radial cam 30 contacts stop 31 to limit the rotary or swivel motion.

The described and illustrated system of levers has the objective of transmitting as rapidly as possible, and with a short control distance and short braking time, the impulses introduced on the hand protection lever 10 upon surpassing of a predetermined holding force of the operating person on the guide handle 7 in order to initiate operation of the band brake. This surpassing of the predetermined holding force can be caused by a centrifugal motion of the motorized chain saw, if the saw chain at its forward direction-reversal zone at the free end of the bar is advanced forward into the wood too rapidly or jams for any other reason and generates a dangerous operating condition.

Figure 2:
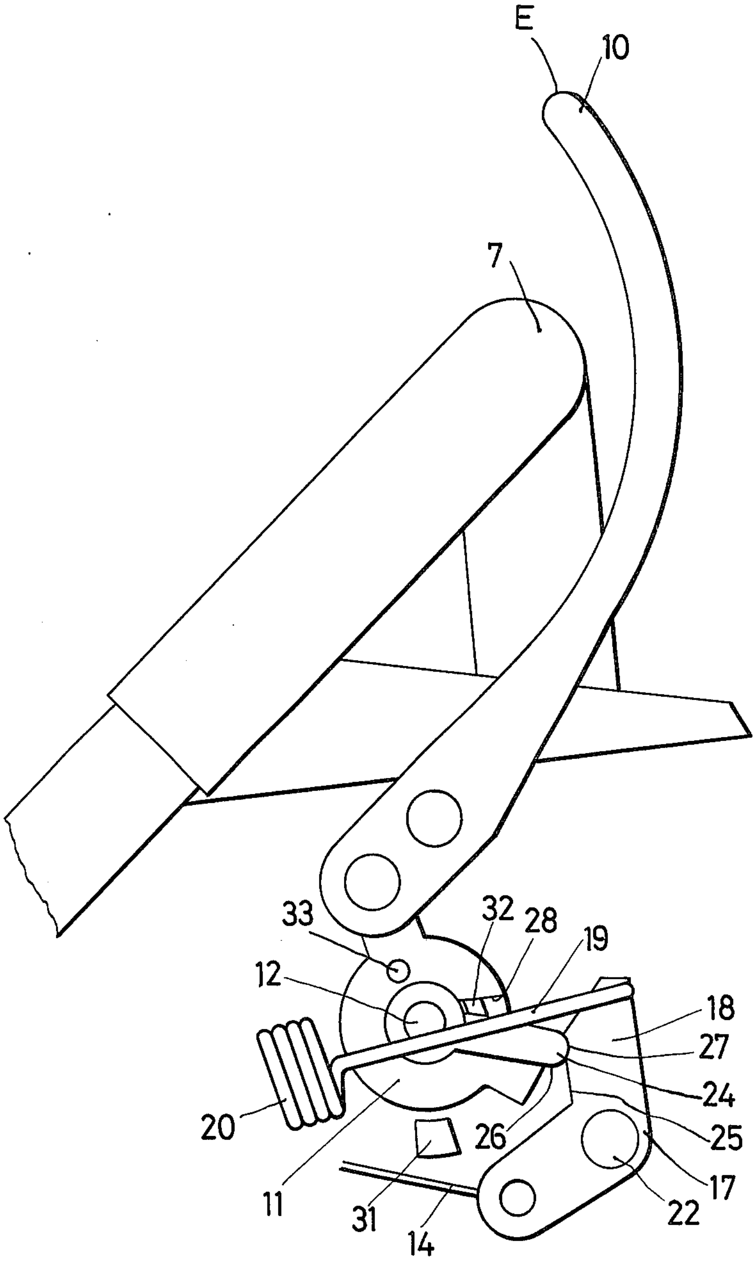
FIG. 2 is an isolated plan view of the brake release mechanism of FIG. 1 in its tension position.
Figure 3:
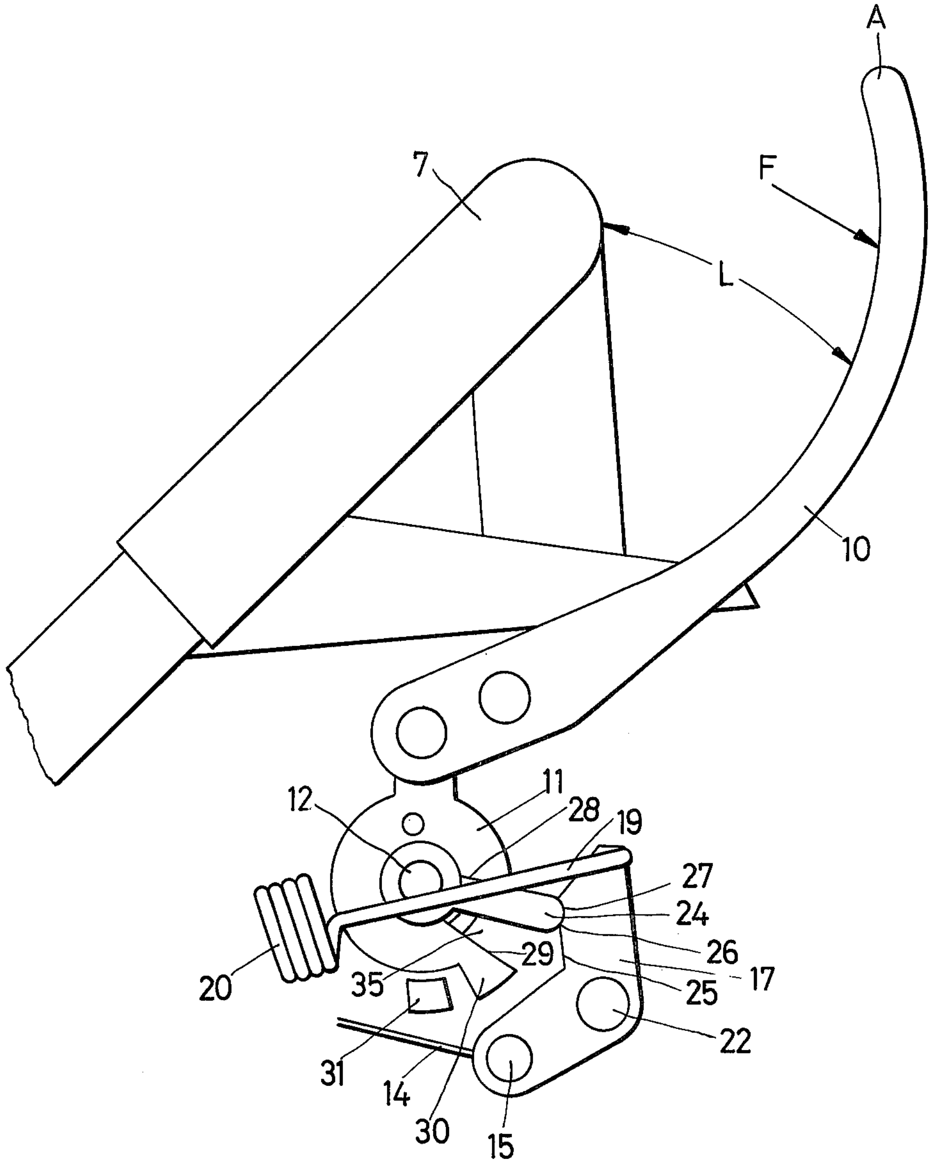
FIG. 3 is an isolated plan view illustraing the brake release mechanism of FIG. 1 in its release position.

The following detailed sequence of motions results for the illustrated brake mechanism:

From its end position E, which is illustrated in FIG. 2, the hand protection lever 10 is first brought into its ready position A in accordance with FIG. 3. This is done by the operating lever spring 32, which rotates the activating cam 11 and thus swings the hand protection lever 10 into position A in accordance with FIG. 3. In this manner, the hand protection lever 10 traverses the distance L. In this ready position, the head 26 of the tongue 24, which is carried along on the stop surface 28, is seated in the stop recess 27.

If now, as the result of a centrifugal motion of the motorized chain saw, a force F of a predetermined magnitude acts on the hand protection lever 10, it is transmitted to tongue 24 through the activating cam 11. With its head 26, the tongue moves over the raised section which is formed at the intersecting zone between the recess 27 and the inner side edge 25 of the rocker arm 17, and is thereby lifted from the stop recess 27 against the increasing tension of the brake spring 20. As soon as the tongue 24 has left the recess 27, the head 26 of the tongue can slide along the inner side edge 25, and it then releases the rocker arm 17. The rocker arm is then rotated in the counter-clockwise direction by the brake spring 20, and thus transmits the force of the spring on the end section 14 of the brake band 9, which then, under the self-intensification effect of the brake drum 5 which rotates in the direction of the arrow, adheres tightly to the brake drum and stops the saw chain 3 and uncouples a centrifugal clutch which may be present between the brake drum 5 and the drive motor. In this braking position, which is illustrated in FIG. 4, the activating cam 11 via radial cam 30 is brought into contact by the operating lever spring 32 against the limit stop 31.

Figure 4:
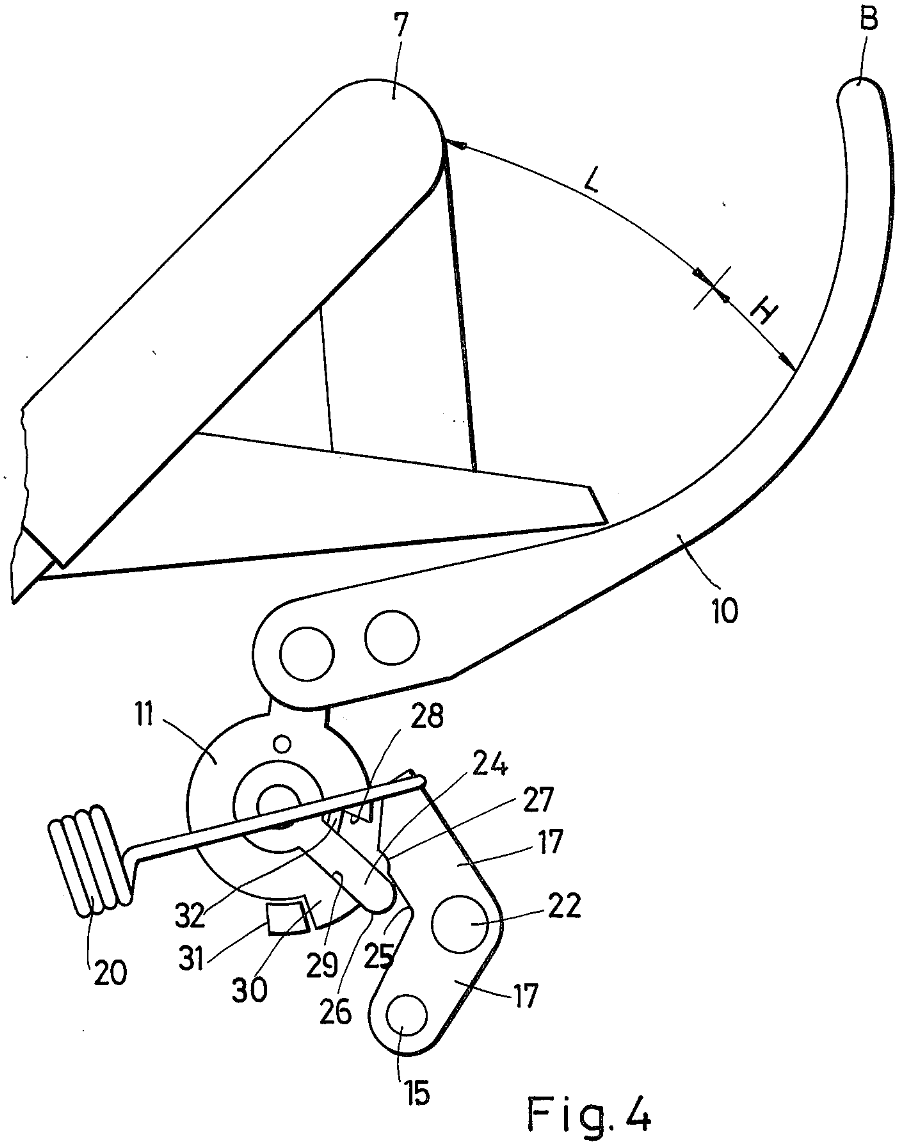
FIG. 4 illustrates again as an isolated plan view the brake release mechanism of FIG. 1 in its braking position after release to intiate the braking process.

From the beginning of the release taking place in position A in accordance with FIG. 3, up to the standstill of the saw chain in the braking position B in accordance with FIG. 4, the hand protection lever 10 traverses the distance H, resulting in a total distance G of the hand protection lever, which is G = L + H.

The tensioning of the brake spring 20 upon release of the brake band 9 from the brake drum takes place as follows:

The hand protection lever 10 is swivelled in the opposite direction toward the guide handle 7, and thus moves from the position B in accordance with FIG. 4 into position E in accordance with FIG. 2, and thus traverses the distance G.

In the tension position E, which is illustrated in FIGS. 1 and 2, the tongue 24 again rests in recess 27. This occurs after the head 26 has first been pressed against the inner side edge 25 and thus causes swivelling of the rocker arm 17 in the clockwise direction, whereby the brake spring 20 is simultaneously tensioned again. In this manner, the brake mechanism is again ready for operation. If, after tensioning, the hand protection lever 10 is released, it moves back into the ready position illustrated in FIG. 3 under the force of the operating lever spring 32, in which position the stop surface 28 contacts the tongue 24.

The following are the most important advantages of the brake mechanism in accordance with this invention:

a. a very short release path H of the hand protection lever 10;

b. a very short reaction time of the mechanical components and thus a short braking time, measured from the touching of the hand protection lever 10 to the standstill of the saw chain;

c. a facilitated tensioning (resetting) of the brake spring 20, because, as a result of the short distance from the hand protection lever 10 to the handle 7, the guiding hand can remain completely on the handle 7;

d. greater safety in case of a possible failure of the brake mechanism, because the brake protection lever 10 retains its protective function and cannot swing downwardly against the bar 4 or the saw chain 3;

e. a low constructional expenditure and small space requirement, both in the axial and also in the radial plane, with respect to the brake drum 5 and the brake band 9, which result from the compact interfitting construction of the lever 10 and associated brake release components.

Figure 5:
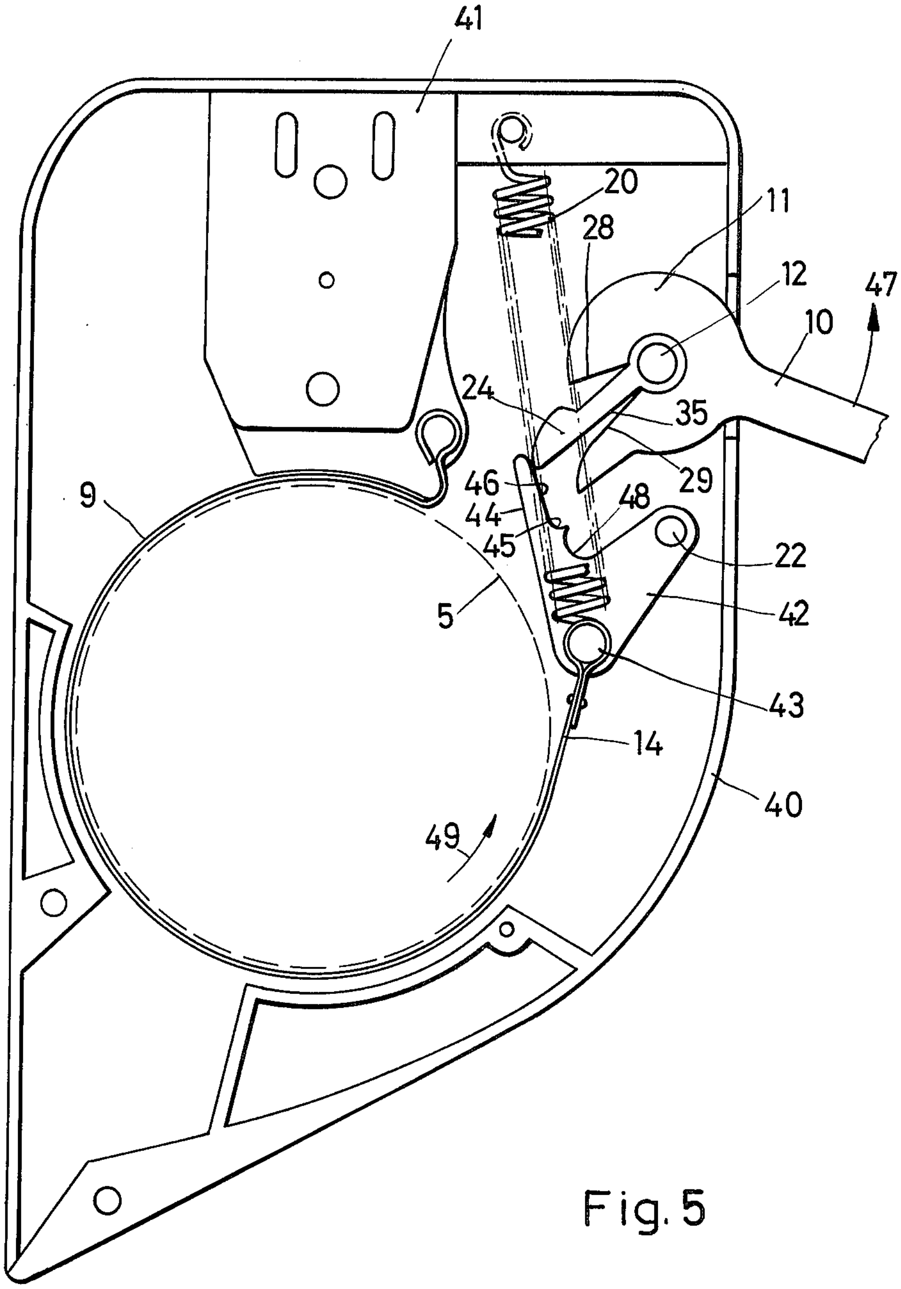
FIG. 5 is a plan view of a second braking mechanism according to the invention, showing the inside view of a housing portion of a motorized chain saw which accommodates the braking mechanism in the tension position, some parts being shown by dashed lines.
Figure 6:
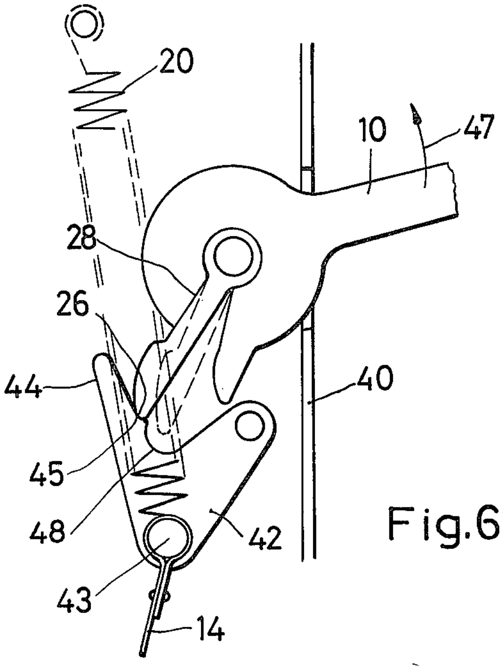
FIG. 6 is an isolated plan view of the brake release mechanism of FIG. 5 in the ready position.
Figure 7:
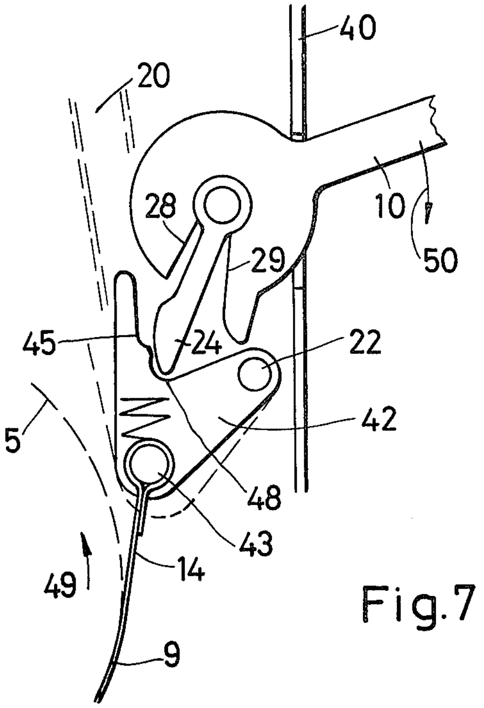
FIG. 7 is an isolated plan view as in FIG. 6 illustrating the brake position after the initiation of the braking process

In a second embodiment, which is illustrated in FIGS. 5 to 7, the brake mechanism is accommodated inside of a covering hood 40, as in the case of the first embodiment. The inside of this hood is illustrated in FIG. 5 and contains a tension plate 41 for the bar 4 of a motorized chain saw, which is to be considered as extending toward the top of FIGS. 5 to 7. Insofar as the same or at least functionally equal components as in the first embodiment are used in the second embodiment, they are designated by the same reference numbers.

As a deviation from the previously described embodiment, the hand protection lever 10 of the second embodiment is integrally connected with the activating cam 11 and is supported in a manner capable of being rotated on the swivel pin 12, on which the tongue 24 can also be rotated. In the axial direction, the tongue 24 is flush with the illustrated front disc surface of the activating cam 11 as well as with its rear disc surface, and therefore requires only very little space in the axial direction. The tongue 24 cooperates with a single-arm rocker arm 42, which has a V-shaped configuration in the side view, and which is rotatably supported on one of its V leg sections on a bearing bolt 22. The rocker arm 42 has a stud bolt 43 in its middle zone, on which both the free end section 14 of the brake band 9 and one of the two ends of the brake spring 20 engage. The brake drum associated with the brake band 9 is indicated by interrupted lines in FIGS. 5 to 7 and is designated as 5.

The V leg 44 extending from the middle zone of the rocker arm 42, evidences, on its inner side edge, a rounded-out stop recess 45, which continues as a slightly curved tension path 46 toward the free end of the leg. The tongue 24 with its head 26, which serves for tensioning and stopping, engages in this stop recess 45 and thus holds the rocker arm 42 in the ready position, illustrated in FIG. 6, against the tension of the tensioned brake spring 20, wherein the brake band 9 is lifted off the brake drum 5. When the hand protection lever 10 is rotated in the direction of the arrow 47 toward the saw chain 3 and the saw bar 4, the stop surface 28 presses (as in the first embodiment) the tongue 24 from its stop recess 45, whereby the tongue can fall into a release notch 48 in the middle zone of the rocker arm 42 and thus unlock the rocker arm 42. The latter can then move in a clockwise direction around its bearing bolt 22, under the tension of the brake spring 20, until the brake band 9 contacts the brake drum 5 and is then held under tension on it by the brake spring 20. The braking force is reinforced by the moment of friction of the brake drum, which rotates in the direction of the arrow 49, and results in a very strong braking effect, so that the saw chain comes to a standstill in an extremely short time period.

In order to release the brake mechanism and to return it to its ready position, which is illustrated in FIG. 6, the hand protection lever 10 needs only to be rotated back in the direction of the arrow 50 against the handle of the chain saw (which is not illustrated). Then, the second stop surface 29 rests against the tonque 24, and with further rotating motion of the lever 10, the tongue 24 rotates the rocker arm 42 back in the counterclockwise direction into the position indicated by broken lines in FIG. 7. This again tensions the brake spring 20 and lifts the brake band 9 from the brake drum 5.

In addition to the above mentioned advantages of the first embodiment, the second embodiment manifests a still further constructional simplification and an even smaller space requirement.

What is claimed is:

1. A braking mechanism for a hand-held, motor-driven chain saw which includes a guide bar for the chain, means connected to the shaft of the motor for driving the chain around the guide bar and a guide handle arranged on the saw generally transverse to the guide bar, said braking mechanism comprising:

- a brake drum which rotates with the driving means for the chain;
- a braking member positioned to selectively contact said brake drum in order to stop the chain;
- a lever pivotably mounted on the saw and extending to the vicinity of the guide handle;
- means including an arm pivotably connected to the saw and connected to said braking member for selectively moving said braking member into contact with said brake drum upon rotation of said arm into a braking position;
- a spring connected to the saw and to said arm for biasing said moving means toward the braking position and for applying the braking member to said drum with a force sufficient to brake said drum;
- a tongue member pivotably attached to the saw and adapted to be moved in contacting relationship with said arm to force said arm at least out of the braking position and to hold said arm in a tensioned, non-braking position against the force of said spring; and
- means for activating movement of said tongue member relative to said arm, said activating means comprising a cam member, separate from and acting on said tongue member, pivotably mounted on the saw coaxially with and coplanar with said tongue member, said cam member being responsive to rotation of said lever in a first direction for displacing said tongue member from its position holding said arm in tensioned position against the force of said spring to provide a quick release of said arm out of the tensioned position, whereby an immediate braking effect takes place, and being responsive to rotation of said lever in a second, opposite direction to move said tongue member in contacting relationship with said arm to force said arm out of the braking position and into the tensioned position.

2. The braking mechanism as defined by claim 1, wherein said arm comprises at least one locking recess in an edge thereof and said tongue member is adapted to engage in the recess as stop to prevent said arm from moving into the braking position.

3. The braking mechanism as defined by claim 2, wherein said activating means activates movement of said tongue member to move said arm out of the braking position in response to rotating movement of said lever toward the guide handle, whereby said tongue member moves in contacting relationship with said arm until it engages in the locking recess in said arm and locks said arm out of the braking position.

4. The braking mechanism as defined by claim 2, wherein said activating means activates movement of said tongue member out of engagement in said locking recess in response to rotating movement of said lever away from the guide handle.

5. The braking mechanism as defined by claim 4, wherein said braking member moving means comprises a V-shaped rocker arm, one leg of which includes the locking recess on its side facing said cam member.

6. The braking mechanism as defined by claim 5, wherein said rocker arm is pivoted at its base (vertex).

7. The braking mechanism as defined by claim 6, wherein said braking member is connected to the other leg of said rocker arm, the locking recess is on said one leg and said spring is attached to said one leg in the vicinity of the locking recess.

8. The braking mechanism as defined by claim 5, wherein said rocker arm is pivoted on the other of its legs, the locking recess is located on said one leg and said spring and said braking member are connected to said rocker arm at its base (vertex).

9. The braking mechanism as defined by claim 4, wherein said lever and said cam member are integral and comprise a single pivotable connection to the saw.

10. The braking mechanism as defined by claim 2, wherein said cam member includes stops for limiting the rotational freedom of said tongue member with respect thereto.

11. The braking mechanism as defined by claim 10, wherein said stops are formed by the edges of a radial, wedge-shaped cut-out in said cam member, within which said tongue member is positioned, said edges acting as the camming surfaces of said cam member.

12. The braking mechanism as defined by claim 11, wherein the tongue member is cylindrically configured on its inner end section and forms a swivel bearing for the cam member.

13. The braking mechanism as defined by claim 2, wherein the end of said tongue member which engages with said locking recess is generally rounded and wherein the locking recess comprises a rounded cross-section.

14. The braking mechanism as defined by claim 1, further comprising a stop member fixed to the saw near cam member, and wherein said cam member further comprises a radially projecting protrusion adapted to abut against said stop member when said arm is in the braking position.

15. The braking mechanism as defined by claim 1, further comprising means including a spring for rotationally biasing said lever away from the guide handle.

16. The braking mechanism as defined by claim 1, wherein said braking member is a band-shaped member surrounding a substantial portion of said brake drum.

17. A hand-held internal combustion motor-driven chain saw, comprising a guide bar for the chain, means connected to the shaft of the motor for driving the chain around the guide bar, a guide handle arranged on the saw generally transverse to the guide bar and a mechanism for braking the chain, said chain braking mechanism comprising:

- a brake drum which rotates with the driving means for the chain;
- a braking member positioned to selectively contact said brake drum in order to stop the chain;

a lever pivotably mounted on the saw and extending to the vicinity of the guide handle;

means including an arm pivotably connected to the saw and connected to said braking member for selectively moving said braking member into contact with said brake drum upon rotation of said arm into a braking position;

a spring connected to the saw and to said arm for biasing said moving means to toward the braking position and for applying the braking member to said drum with a force sufficient to brake said drum;

a tongue member pivotably attached to the saw and adapted to be moved in contacting relationship with said arm to force said arm at least out of the braking position and to hold said arm in a tensioned, non-braking position against the force of said spring; and means for activating movement of said tongue member relative to said arm, said activating means comprising a cam member, separate from and acting on said tongue member, pivotably mounted on the saw coaxially with and coplanar with said tongue member, said cam member being responsive to rotation of said lever in a first direction for displacing said tongue member from its position holding said arm in tensioned position against the force of said spring to provide a quick release of said arm out of the tensioned position, whereby an immediate braking effect takes place, and being responsive to rotation of said lever in a second, opposite direction to move said tongue member in contacting relationship with said arm to force said arm out of the braking position and into the tensioned position.

* * * * *